United States Patent
Tomiyama et al.

(10) Patent No.: US 7,051,347 B2
(45) Date of Patent: *May 23, 2006

(54) METHOD OF PRODUCING OPTICAL RECORDING MEDIUM BY TRANSFER PROCESS USING A STAMPER, AND OPTICAL RECORDING MEDIUM PRODUCED THEREBY

(75) Inventors: Morio Tomiyama, Ikoma (JP); Kazuya Hisada, Osaka (JP); Eiichi Ito, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 392 days.

This patent is subject to a terminal disclaimer.

(21) Appl. No.: 10/381,152

(22) PCT Filed: Jun. 12, 2002

(86) PCT No.: PCT/JP02/05823

§ 371 (c)(1),
(2), (4) Date: Mar. 20, 2003

(87) PCT Pub. No.: WO02/103691

PCT Pub. Date: Dec. 27, 2002

(65) Prior Publication Data

US 2005/0259562 A1    Nov. 24, 2005

(30) Foreign Application Priority Data

Jun. 14, 2001    (JP) .............................. 2001-179708

(51) Int. Cl.
G11B 7/24 (2006.01)
B32B 3/02 (2006.01)

(52) U.S. Cl. ..................................... 720/718; 428/64.4
(58) Field of Classification Search .................... None
See application file for complete search history.

(56) References Cited

FOREIGN PATENT DOCUMENTS

JP        01180328 A  *  7/1989

(Continued)

*Primary Examiner*—David Davis
(74) *Attorney, Agent, or Firm*—Hamre, Schumann, Mueller & Larson, P.C.

(57) ABSTRACT

A method for producing an optical recording medium of the present invention including a first laminating step, a second transferring step, a third detaching step, and a fourth forming step. The first step includes laminating a substrate and a transfer stamper with an uncured ultraviolet-curable resin interposed therebetween. The transfer stamper has recesses/projections that provide information to be transferred. The second step includes transferring the information to be transferred of the transfer stamper onto a surface of the ultraviolet-curable resin. The third step includes detaching the transfer stamper from the ultraviolet-curable resin at an interface therebetween after the ultraviolet-curable resin is cured. The fourth step includes forming a thin film layer on the information-transferred surface of the ultraviolet-curable resin. The thin film layer includes either a recording film or a reflection film. The method requires that either a weight of the transfer stamper or a viscosity of the ultraviolet-curable resin is set so that a surface roughness of the information-transferred surface of the ultraviolet-curable resin is smaller than a surface roughness of the surface of the transfer stamper on which the information to be transferred is provided.

16 Claims, 9 Drawing Sheets

FOREIGN PATENT DOCUMENTS

| | | |
|---|---|---|
| JP | 5-101445 | 10/1991 |
| JP | 9-115191 | 10/1995 |
| JP | 8-77621 | 3/1996 |
| JP | 8-106656 | 4/1996 |
| JP | 11-58401 | 8/1997 |
| JP | 2001-126322 | 10/1999 |

* cited by examiner

METHOD OF PRODUCING OPTICAL RECORDING MEDIUM BY TRANSFER PROCESS USING A STAMPER, AND OPTICAL RECORDING MEDIUM PRODUCED THEREBY

TECHNICAL FIELD

The present invention relates to an optical recording medium for reproduction or for recording and reproduction, and to a method for producing the same.

BACKGROUND ART

Recently, with an increase in the information amount that information devices and audiovisual devices are required to process, optical disks that are superior in allowing for easy data access, large capacity data storage, and reduction of device sizes have attracted more attention as recording media, and the recording of information at a higher density has been attempted. For instance, as an optical disk with a higher density, an optical disk having a capacity of approximately 25 GB has been proposed to which the recording and reproduction is performed with the use of a recording/reproduction head whose recording/reproduction laser beam source emits light with a wavelength of approximately 400 nm and whose objective lens for converging a laser beam has a numerical aperture (NA) of 0.85.

The following will describe a configuration of a conventional optical disk and a method for producing the same, while referring to FIGS. 2 to 5. FIGS. 2A to 2F illustrate a method for producing a nickel (Ni) stamper as a substrate mold for use in the production of a conventional optical disk. In the production of the Ni stamper, first of all, a photosensitive film 202 is formed on a glass plate 201 by applying a photosensitive material such as a photoresist thereon (see FIG. 2A), and recording track portions are exposed by optical recording with use of a laser beam 203 (see FIG. 2B). In FIG. 2B, 202a denotes an exposed portion. The photosensitive material in the recording track portions thus exposed is removed through a developing process, and an optical recording master 205 in which a recording track pattern 204 is formed is produced (see FIG. 2C). The pattern of the recording track pattern 204 formed on the photosensitive film 202 is transferred to a conductive film 206 (material: Ni) formed by sputtering or vapor deposition (see FIG. 2D). Furthermore, to increase the rigidity and thickness of the conductive film 206, a Ni plating film 207 is formed (see FIG. 2E). Then, the conductive film 206 and the Ni plating film 207 are detached at an interface between the photosensitive film 202 and the conductive film 206, so that a Ni stamper 208 is produced (see FIG. 2F).

FIG. 3 illustrates a cross section of a thick-substrate transfer-type optical disk as a conventional optical disk. The thick-substrate transfer-type optical disk includes a first substrate 302 having a surface on one side on which recesses/projections are provided as signal pits or recording tracks, a thin film layer 301 provided on the surface of the first substrate 302 on which the recesses/projections are provided, a second substrate 303 arranged facing the first substrate 302, and a transparent layer 304 interposed between the first substrate 302 and the second substrate 303 so as to cause them to adhere with each other.

Signal pits or recording tracks are transferred in a form of recesses onto one side of the first substrate 302 by injection compression molding or the like using the Ni stamper 208 shown in FIG. 2F. The first substrate 302 has a thickness of approximately 1.1 mm. The thin film layer 301 includes a recording film and/or a reflection film, and is formed by sputtering, vapor deposition, or the like on the surface of the first substrate 302 on which signal pits or recording tracks are formed. The second substrate 303 is made of a material that is transparent (has transparency) with respect to recording/reproduction light, and has a thickness of approximately 0.1 mm. The transparent layer 304 is provided to cause the two substrates 302 and 303 to adhere with each other, and is made of an adhesive such as ultraviolet-curable resin or the like.

The recording/reproduction of such a conventional thick-substrate transfer-type optical disk is carried out by projecting a recording/reproduction laser beam thereto from the second substrate 303 side.

Furthermore, FIG. 4 illustrates a cross section of a thin-substrate transfer-type optical disk as another conventional optical disk. The thin-substrate transfer-type optical disk includes a first substrate 402, a signal transfer layer 405 provided on the first substrate 402 that has a surface on one side on which recesses/projections are provided as signal pits or recording tracks, a thin film layer 401 provided on the surface of the signal transfer layer 405 on which the recesses/projections are provided, a second substrate 403 arranged facing the first substrate 402, and a transparent layer 404 interposed between the first substrate 402 and the second substrate 403 so as to cause them to adhere with each other.

The first substrate 402 is made of a material that is transparent (has transparency) with respect to recording/reproduction light, and has a thickness of approximately 0.1 mm. The signal transfer layer 405 is a layer made of an ultraviolet-curable resin, on one of whose surfaces recesses are formed by compression transfer using the Ni stamper 208 shown in FIG. 2F so as to provide signal pits or recording tracks. The compression transfer with the ultraviolet-curable resin is performed by dripping the ultraviolet-curable resin concentrically on the first substrate 402, applying the Ni stamper 208 thereon so that an information surface (surface where the recording pattern 204 is provided) of the Ni stamper 208 faces the first substrate 402, and applying a pressure on the transfer stamper 208. Thus, the spreading of the ultraviolet-curable resin and the transfer of the pattern of the information surface are performed. The thin film layer 401 includes a recording film and/or a reflection film, which are formed by sputtering or vapor deposition on the surface of the signal transfer layer 405 on which signal pits or recording tracks are formed. The second substrate 403 has a thickness of approximately 1.1 mm. The transparent layer 404 is provided to cause the two substrates 402 and 403 to adhere with each other, and is made of an adhesive such as ultraviolet-curable resin or the like.

The recording/reproduction of such a conventional thin-substrate transfer-type optical disk is carried out by projecting a recording/reproduction laser beam thereto from the first substrate 402 side.

The following will describe a configuration of an optical disk in which a phase-change recording material is used for forming the thin film layer so as to form a recording film, so that the optical disk is modified to be a phase-change optical disk. FIG. 5 is an enlarged cross-sectional view illustrating a configuration of the thick-substrate transfer-type optical disk shown in FIG. 3 in which a phase-change recording material is used for forming the thin film layer 301 so as to form a recording film. In the thick-substrate transfer-type optical disk, recording tracks are formed on an information surface 302a of the first substrate 302 as the thick substrate.

The recording tracks are grooves formed with recesses/projections at a track pitch 505 of approximately 0.3 μm. Furthermore, a reflection film 501 made of AgPdCu or the like, a dielectric film 502 made of a dielectric material such as ZnS—SiO$_2$, a recording film 503, and a dielectric film 504 made of a dielectric material such as ZnS—SiO$_2$ are formed by sputtering or the like. The recording film 503 is formed by sputtering or the like, with a material such as Ge (germanium), Sb (antimony), and Te (tellurium). The dielectric films 502 and 504 are provided so as to protect the recording film 503 from damage caused by heat, moisture, etc. These reflection film 501, the dielectric films 502 and 504, and the recording film 503 compose the thin film layer 301.

A phase-change recording material makes a transition into an amorphous state in the case where it is cooled abruptly after it is molten, whereas it makes a transition into a crystalline state in the case where it is cooled gradually after it is heated. An optical disk having a recording film that is made of such a phase-change recording material by taking advantage of the foregoing property makes reversible transitions between the crystalline state and the amorphous state, thereby being capable of overwriting. The reproduction of signals on the optical disk is performed in the following manner: while focusing control and tracking control are carried out so that a reproduction laser beam having a small constant intensity is positioned on a groove track in which signals are recorded, a change in an amount of light reflected from the optical disk is detected by a photodetector device, utilizing a property such that amorphous portions as recording marks and crystalline portions other than the recording marks have different reactances or different transmittances. It should be noted that FIG. 5 illustrates an example of the thick-substrate transfer-type optical disk shown in FIG. 3 modified by using a phase-change recording material to form the thin film layer 301, and in the case of the thin-substrate transfer-type optical disk shown in FIG. 4, it also is possible to form the thin film layer 401 using a phase-change recording material.

A phase-change optical disk in which the thin film layer 301 or 401 is formed with a phase-change recording material is described as the foregoing conventional optical disk, but it is possible to provide an optical disk that is capable of reproduction solely by forming signal pits on the substrate and forming a reflection film in the thin film layer 301 or 401.

However, with an increase in the density of an optical recording medium, the reproduction of an optical recording medium is affected by fine recesses/projections on the optical recording medium as noise sources more than before. In the case where, like a Ni stamper used in the production of a conventional optical disk, a Ni stamper is produced through the laser exposure of a photosensitive material such as a photoresist for recording signal pits or recording tracks, which is followed by the development, the sputtering and the plating, the roughness of the photosensitive material and the like due to the coarseness of the photosensitive material or caused by a developer is transferred to the Ni stamper from the photosensitive material surface, thereby leaving fine recesses/projections on the Ni stamper. Therefore, in the case where an optical disk is produced using such a Ni stamper, the fine recesses/projections become noise sources. In the case where the injection compression molding or the compression transfer of an ultraviolet-curable resin is used for transferring a surface state of a transfer stamper to a substrate, the surface roughness of the stamper is transferred to the substrate in detail by compression. Therefore, an optical disk including such a substrate has high reproduction noise. Furthermore, in the foregoing production by the injection compression molding or compression transfer with use of an ultraviolet-curable resin in which the foregoing Ni stamper is employed, it is difficult to form, on a substrate surface, signal pits or recording tracks with recesses/projections that have a uniform depth/height (level difference between bottoms of the recesses and tops of the projections) thereby providing high reproducibility, or alternatively, to make uniform within a disk surface a sum of thicknesses of a thin substrate and an ultraviolet-curable resin that determines the conversion of a recording/reproduction laser light upon the recording/reproduction of a signal surface of a thin-substrate transfer-type optical disk.

DISCLOSURE OF THE INVENTION

Therefore, a method for producing an optical recording medium according to the present invention includes: a first step of laminating a substrate and a transfer stamper with a not cured ultraviolet-curable resin interposed therebetween, the transfer stamper having, on at least one of the surfaces thereof, recesses/projections that provide information to be transferred; a second step of transferring the information to be transferred of the transfer stamper onto a surface of the ultraviolet-curable resin; a third step of detaching the transfer stamper from the ultraviolet-curable resin at an interface therebetween after the ultraviolet-curable resin is cured; and a fourth step of forming a thin film layer on the information-transferred surface of the ultraviolet-curable resin, the thin film layer including at least one of a recording film and a reflection film. In the method, at least one of a weight of the transfer stamper and a viscosity of the ultraviolet-curable resin is set so that a surface roughness of the information-transferred surface of the ultraviolet-curable resin is smaller than a surface roughness of the surface of the transfer stamper on which the information to be transferred is provided.

Furthermore, an optical recording medium of the present invention is produced by the foregoing optical recording medium producing method of the present invention described above.

DESCRIPTION OF THE INVENTION

Figure 1:
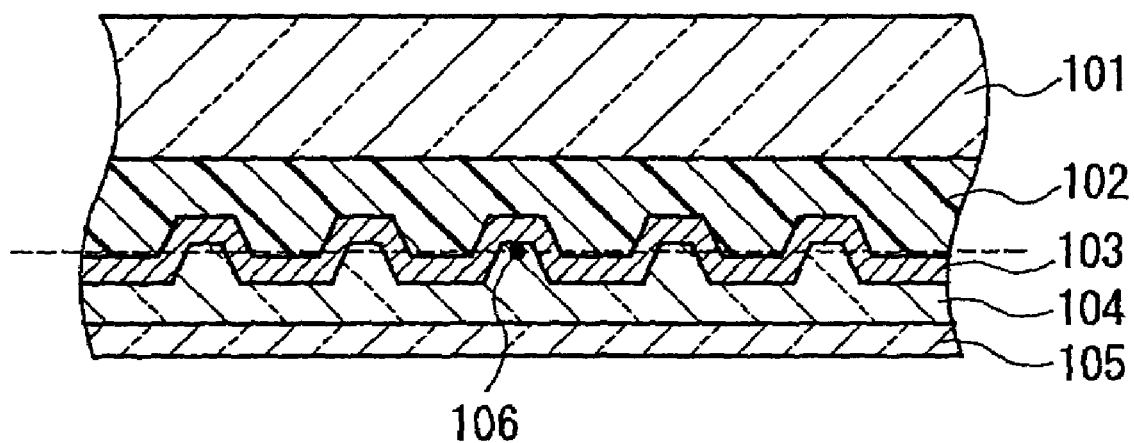
FIG. 1 is a cross-sectional view of an optical disk according to Embodiment 1, which is produced by an optical recoding medium producing method of the present invention.

A method for producing an optical recording medium according to the present invention includes: a first step of laminating a substrate and a transfer stamper with a not cured ultraviolet-curable resin interposed therebetween, the transfer stamper having, on at least one of surfaces thereof, recesses/projections that provide information to be transferred; a second step of transferring the information to be transferred of the transfer stamper onto a surface of the ultraviolet-curable resin; a third step of detaching the transfer stamper from the ultraviolet-curable resin at an interface therebetween after the ultraviolet-curable resin is cured; and a fourth step of forming a thin film layer on the information-transferred surface of the ultraviolet-curable resin, the thin film layer including at least one of a recording film and a reflection film. In the method, at least one of a weight of the transfer stamper and a viscosity of the ultraviolet-curable resin is set so that a surface roughness of the information-transferred surface of the ultraviolet-curable resin is smaller than a surface roughness of the surface of the transfer stamper on which the information to be transferred is provided. This method makes it possible to prevent fine recesses/projections present on the surface of the transfer stamper on which information to be transferred is provided from being transferred onto the surface of the ultraviolet-curable resin that constitutes an information surface of the optical recording medium. By so doing, it is possible to provide an optical recording medium with reduced reproduction noises.

In the foregoing optical recording medium producing method of the present invention, in the second step, spinning preferably is carried out in a state in which the substrate and the transfer stamper are laminated so that the ultraviolet-curable resin is spread and the information to be transferred from the transfer stamper is transferred to the ultraviolet-curable resin. This is intended to allow the ultraviolet-curable resin to be formed with a uniform thickness inside the surface, and further, to allow information that is expressed as, for instance, a pattern of recesses/projections forming signal pits or recording tracks to be transferred with excellent uniformity and reproducibility onto the ultraviolet-curable resin.

In the optical recording medium producing method of the present invention, the ultraviolet-curable resin preferably has a viscosity of not less than 30 mPa·s and not more than 4000 mPa·s, more preferably, not less than 30 mPa·s and not more than 500 mPa·s. This causes the information to be transferred of the transfer stamper to be transferred to the ultraviolet-curable resin with a smaller depth, so as to prevent the surface roughness of the transfer stamper from being transferred to the ultraviolet-curable resin. It should be noted that this viscosity is a value measured in an environmental condition of 20° C. to 25° C.

In the optical recording medium producing method of the present invention, a depth/height of recesses/projections formed on the ultraviolet-curable resin as a result of the transfer preferably is 5% to 30% smaller, more preferably, 5% to 20% smaller, than the depth/height of the recesses/projections of the transfer stamper that provide information to be transferred. This is intended to prevent the surface roughness of the transfer stamper from being transferred to the ultraviolet-curable resin.

In the optical recording medium producing method of the present invention, a track pitch of recording tracks or signal pits to be transferred that are included in the information to be transferred of the transfer stamper preferably is 0.25 μm to 0.8 μm. The reason is as follows. A track pitch of greater than 0.80 μm causes the surface roughness of the transfer stamper to be transferred onto the ultraviolet-curable resin in detail, thereby increasing the reproduction noise. Furthermore, a track pitch of smaller than 0.25 μm makes it difficult to perform uniform transfer within the surface, thereby causing transfer irregularities.

In the optical recording medium producing method of the present invention, a width of the recording tracks to be transferred or a width of the signal pits preferably is 30% to 70% of the track pitch. This is intended to obtain excellent signal characteristics or tracking control signal characteristics upon recording/reproduction.

In the optical recording medium producing method of the present invention, a depth of recording tracks or signal pits to be transferred that are included in the information to be transferred of the transfer stamper preferably is 10 nm to 100 nm.

In the optical recording medium producing method of the present invention, the transfer stamper preferably has a weight per unit area of 0.03 g/cm$^2$ to 0.20 g/cm$^2$. This is intended to allow the information to be transferred of the transfer stamper to be transferred onto the ultraviolet-curable resin with a smaller depth, so as to prevent the surface roughness of the transfer stamper from being transferred onto the ultraviolet-curable resin.

In the optical recording medium producing method of the present invention, the transfer stamper preferably is made of a resin material. This allows information such as recording tracks or signal pits to be formed easily, and enables the subtle control of weight.

In the optical recording medium producing method of the present invention, the recording film can be made of a phase-change recording film material. This is intended to form an overwritable phase-change recording medium.

In the optical recording medium producing method of the present invention, the thin film layer can be composed of only a reflection film. This is intended to reproduce signals of the optical recording medium with reflected light.

In the optical recording medium producing method of the present invention, the stamper preferably is positioned on an upper side with respect to the substrate. This is intended to utilize the weight of the transfer stamper itself in spreading the ultraviolet-curable resin and performing the transfer to the ultraviolet-curable resin.

In the optical recording medium producing method of the present invention, the transfer stamper preferably has a thickness of 0.3 mm to 1.1 mm. The reason is as follows. In the case where the transfer stamper has a thickness of less than 0.3 mm, the rigidity thereof decreases, thereby allowing warpage to occur easily. On the other hand, a thickness thereof of more than 1.1 mm makes it difficult to perform spinning in a state in which the transfer stamper and the first substrate are laminated.

An optical recording medium of the present invention is produced by the optical recording medium producing method of the present invention described above. With this, an optical recording medium with reduced production noise can be provided.

The following will describe embodiments of the present invention while referring to the drawings.

EMBODIMENT 1

FIG. 1 is a cross-sectional view illustrating an optical disk according to an embodiment of an optical recording medium of the present invention. An optical disk according to the present embodiment includes a first substrate 101 as a thick substrate, a signal transfer layer 102, a thin film layer 103, a second substrate 105, and a transparent layer 104. The signal transfer layer 102 is provided on a surface of the first substrate 101 and has a pattern of recesses/projections of signal pits, recording tracks, etc. on a surface on a side opposite to the first substrate 101. The thin film layer 103 is provided on the surface of the signal transfer layer 102 having the pattern of recesses/projections. The second substrate 105 is a thin substrate arranged facing the first substrate 101. The transparent layer 104 is provided so as to cause the first substrate 101 and the second substrate 105 to adhere to each other.

Figure 2A:
FIGS. 2A to 2F are cross-sectional views illustrating a process of producing a stamper for use in an optical disk substrate production.
Figure 2B:
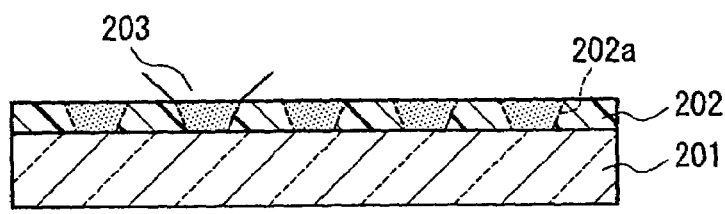
Figure 2C:
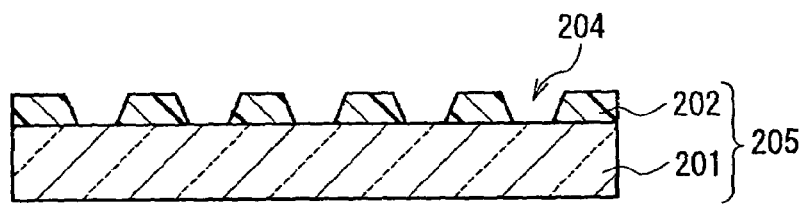
Figure 2D:
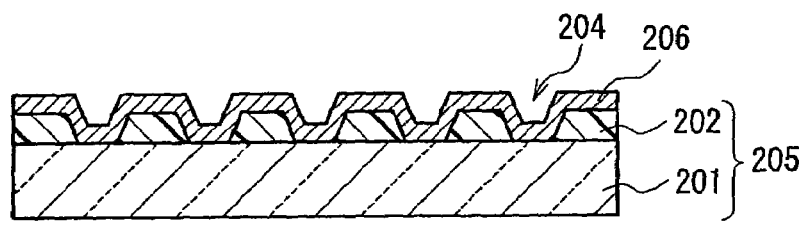
Figure 2E:
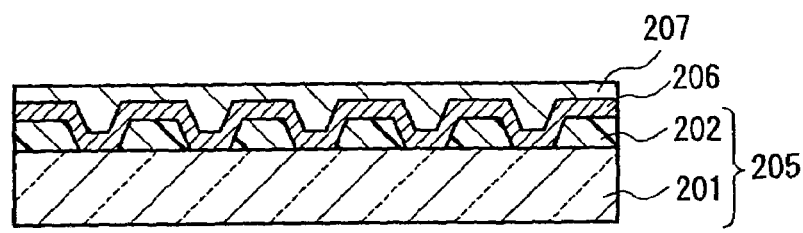
Figure 2F:
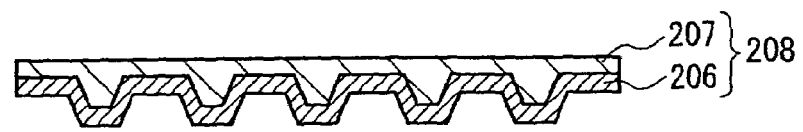

To form the first substrate 101, an approximately 1.1 mm-thick disk made of polycarbonate is used so as to prevent warpage and improve the rigidity of a resulting disk and to provide a thickness compatibility thereof with an optical disk such as a CD or a DVD. The signal transfer layer 102 is made of an ultraviolet-curable resin, and has projections on one side to form signal pits or recording tracks, which are formed by transferring a pattern of a transfer stamper. The transfer stamper is formed by applying a resin such as polycarbonate onto a conventional Ni stamper shown in FIG. 2F by injection compression molding or the like, and has a pattern of recesses/projections on at least one side thereof as information to be transferred. To form the transfer stamper, a disk is used in which recording tracks or signal pits are formed with recesses so that a track pitch is approximately 0.25 μm to 0.8 μm and each groove has a width of approximately 30% to 70% of the track pitch, with a view to obtaining excellent signal characteristics or excellent tracking control signal characteristics upon recording/reproduction.

FIGS. 6A to 6E illustrate a process through which the signal transfer layer 102 is formed on the first substrate 101 as a base. First of all, a first substrate 601 as a base is fixed on a turntable 602 by a disk centering jig 603 provided substantially at the center of the turntable 602 as well as by suction of a plurality of small vacuum holes (not shown) provided on an upper surface of the turntable 602, so as to reduce the eccentricity of the first substrate 601 from a rotational axis of the turntable 602 when the first substrate 601 is placed on the turntable 602 (see FIG. 6A). An ultraviolet-curable resin 604 is applied with a dispenser on the first substrate 601 fixed on the turntable 602 so that the ultraviolet-curable resin 604 is spread over a range of a predetermined radius substantially in a concentric form (see FIG. 6B). Furthermore, a transfer stamper 605 is laminated on the first substrate 601 on which the ultraviolet-curable resin 604 is applied so that an information surface of the transfer stamper 605 faces the first substrate 601.

The ultraviolet-curable resin 604 is spread by spinning the turntable 602 in a state in which the first substrate 601 and the transfer stamper 605 are laminated (see FIG. 6C), while simultaneously a pattern of recesses/projections forming the recording tracks or signal pits on the information surface of the transfer stamper 605 are transferred onto a surface of the ultraviolet-curable resin 604. Here, the ultraviolet-curable resin 604 flows toward a periphery due to a centrifugal force generated by the spinning, which tends to make it difficult to fill the ultraviolet-curable resin 604 in a central portion inside the range of the predetermined radius to which the ultraviolet-curable resin 604 is dripped. To compensate this, the ultraviolet-curable resin 604 between the first substrate 601 and the transfer stamper 605 may be sucked toward the central portion by a vacuum drawing mechanism 6A provided at the centering jig 603. Furthermore, in order to transfer the pattern formed on the information surface of the transfer stamper 605 to the ultraviolet-curable resin 604 at a rate of approximately 90% of a depth/height the recesses/projections (in order to transfer the pattern so that recesses/projections formed on the ultraviolet-curable resin 604 by transfer have a depth/height approximately 10% smaller than the depth/height of the recesses/projections formed on the information surface of the transfer stamper 605 as information to be transferred), a resin containing, for instance, an acrylic resin as a principal component, having a viscosity of approximately 150 mPa·s in the use environment (ambient temperature is 20° C. To 25° C., which applies to the viscosities described below), is used as the ultraviolet-curable resin 604, while a disk made of polycarbonate that is 120 mm in diameter and 1.1 mm in thickness, has a center hole at center with a diameter of 30 mm, and is approximately 16 g in weight (weight per unit area: 0.15 g/cm$^2$) is used as the transfer stamper 605. It should be noted that, other than polycarbonate, a polyolefin-based resin or an acryl-based resin may be used for forming the transfer stamper 605.

Since the transfer stamper 605 is made of a resin, it is possible to form recording tracks or signal pits easily, and since it has a small mass, the variation of thickness thereof ensures subtle control of the weight of the transfer stamper. Furthermore, in the case where a stamper made of Ni or another material is used as in the prior art, the transfer control is difficult since the material has an inferior detachability from an ultraviolet-curable resin used for forming the signal transfer layer. In contrast, however, in the case where the stamper is made of a resin as in the present invention, the foregoing problem can be solved by selecting a resin having a superior detachability from an ultraviolet-curable resin used for forming the signal transfer layer. Moreover, since the ultraviolet-curable resin is spread by spinning, it is possible to make the transfer within the disk surface and the thickness of the ultraviolet-curable resin uniform. In other words, since the weight of the transfer stamper itself is utilized for achieving the transfer without the application of pressure to the transfer stamper as in the prior art, irregular flow of the resin caused by the mechanical application of pressure by no means occurs.

The ultraviolet-curable resin 604 formed between the first substrate 601 and the transfer stamper 605 is cured when ultraviolet light is applied thereto by an ultraviolet projector 606 (see FIG. 6D), and thereafter, the transfer stamper 605 is detached from the ultraviolet-curable resin 604 at an interface therebetween. Thus, on the first substrate 601

Figure 6A:
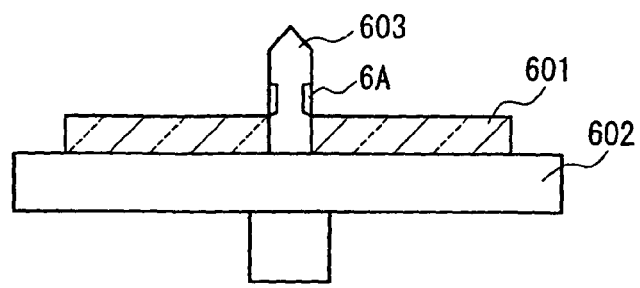
FIGS. 6A to 6E are cross-sectional views illustrating an example of a process of an optical recording medium producing method of the present invention.
Figure 6B:
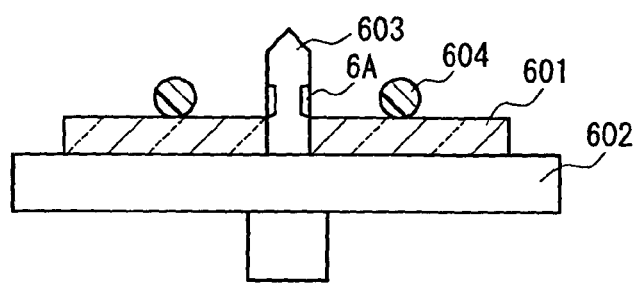
Figure 6C:
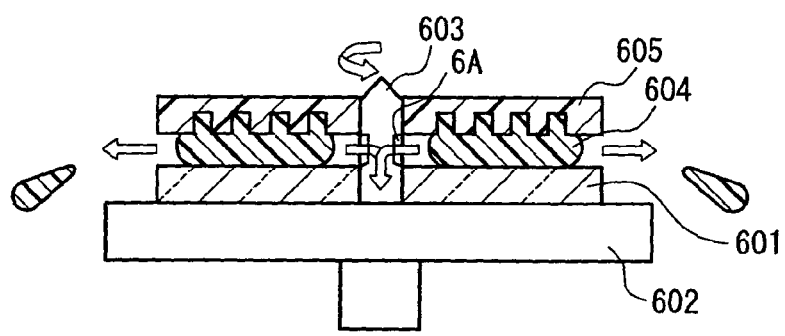
Figure 6D:
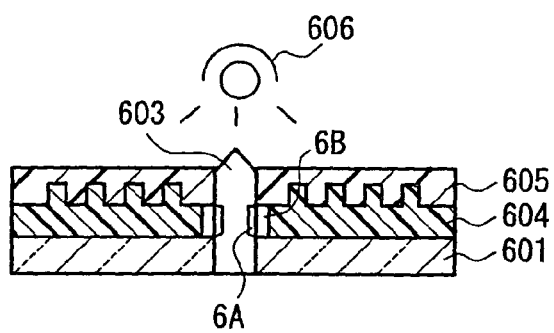
Figure 6E:
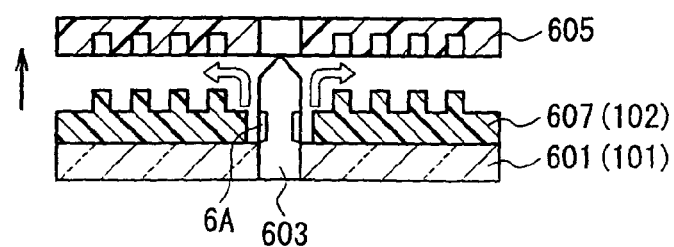

(corresponding to the first substrate 101 in FIG. 1), an ultraviolet-curable resin layer is formed on which the pattern of recesses/projections of the transfer stamper 605 is transferred with a depth/height of approximately 90% of the depth/height of the recesses/projections on the transfer stamper 605: namely, a signal transfer layer 607 (corresponding to the signal transfer layer 102 in FIG. 1) is formed (see FIG. 6E).

As a means for detachment, for instance, a region 6B in which the ultraviolet-curable resin 604 is not filled may be secured in the central portion in a disk obtained by combining the first substrate 601 and the transfer stamper 605 with each other, and a mechanical detaching jig may be inserted or compressed air may be injected between the first substrate 601 and the transfer stamper 605. By so doing, they are detached uniformly in a radial direction of the disk. In the case where the material of the transfer stamper 605 is selected with the detachability thereof taken into consideration so as to ensure the detachment at an interface between the ultraviolet-curable resin 604 and the transfer stamper 605, a polyolefin-based resin preferably is selected. Here, a surface roughness of space tracks on the transfer stamper 605 was determined to be 3 nm according to the measurement by an atomic force microscope, whereas a surface roughness of space tracks formed on the signal transfer layer 607 corresponding to the foregoing transfer stamper 605 was determined to be 1 nm. After the signal transfer layer 607 is formed, a thin film layer 103 including a phase-change recording film capable of repetitive recording/reproduction is formed on the signal transfer layer 607 by sputtering or the like principally.

The transparent layer 104 formed when the thin film layer 103 and the second substrate 105 as the thin substrate are caused to adhere to each other is made of an ultraviolet-curable resin substantially transparent with respect to recording/reproduction light (having transparency), containing, for instance, an acrylic resin as a principal component. The transparent layer 104 is formed in the following manner. First of all, an ultraviolet-curable resin is applied over at least one of the thin film layer 103 and the second substrate 105, and is subjected to spinning so that air bubbles contained in the ultraviolet-curable resin are removed and the thickness thereof is controlled, and thereafter ultraviolet rays are projected thereto so as to cure the ultraviolet-curable resin. The second substrate 105 is composed of an approximately 0.1 mm-thick disk made of polycarbonate that is substantially transparent (has transparency) with respect to recording/reproduction light. The thickness of the transparent layer 104 is controlled so that a focus position 106 where a laser light emitted from the recording/reproduction head is focused falls on a position determined according to a sum of the thicknesses of the second substrate 105 and the transparent layer 104. Thus, with the transparent layer 104 (by curing the ultraviolet-curable resin), the first substrate 101 with the signal transfer layer 102 and the thin film layer 103 provided thereon and the second substrate 105 are caused to adhere to each other.

Figure 7:
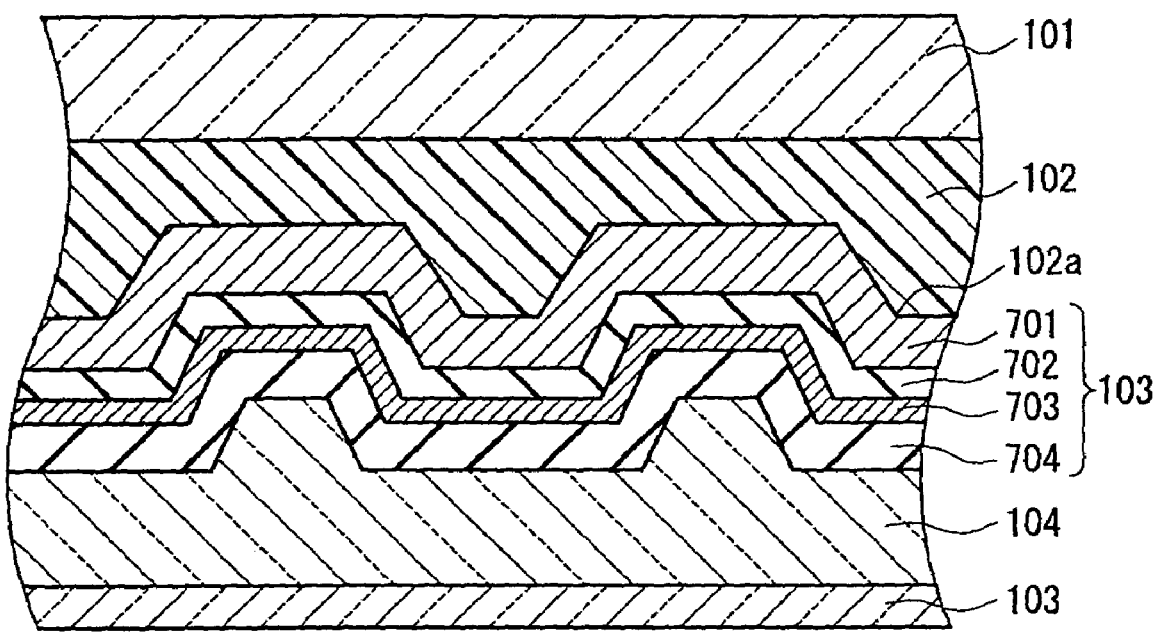
FIG. 7 is an enlarged cross-sectional view illustrating a thin film layer of an optical disk produced by an optical recording medium producing method of the present invention.

FIG. 7 is an enlarged view of a cross section of the thin film layer 103 according to the present embodiment, and the following will describe a configuration of the thin film layer 103 while referring to FIG. 7. On an information-transferred surface (a surface on which information is transferred) 102a of the signal transfer layer 102 formed on the first substrate 101, a reflection film 701 made of Al, a dielectric film 702 made of ZnS—SiO$_2$ or the like, a recording film 703, and a dielectric film 704 made of ZnS—SiO$_2$ or the like are formed by sputtering in the stated order. These reflection films 701, dielectric film 702, recording film 703 and dielectric film 704 compose the thin film layer 103 according to the present embodiment. The reflection film 701 has a thickness of 80 nm, and is configured to be cooled rapidly so as to diffuse heat generated upon signal recording. It should be noted that herein Al is used for forming the reflection film 701, but Ag or Au may be used instead. Furthermore, the recording film 702 is a phase-change recording film made of a material such as Ge, Sb, or Te, which is formed by sputtering or the like.

A conventional thick-substrate transfer-type optical disk and an optical disk according to the present embodiment were subjected to reproducing operations using a recording/reproduction head with a laser wavelength of approximately 400 nm and a numerical aperture (NA) of an objective lens of approximately 0.85, so that noise generated upon disk reproduction were measured. Here, information on information surfaces of the conventional thick-substrate transfer-type optical disk and the optical disk according to the present embodiment was reproduced by rotating the optical disks at a linear velocity of 4.5 m/s, and the level of disk noise at 12 MHz (in a reproduction frequency band of signals with a frequency of 0.375 μm) was measured by a spectrum analyzer.

Figure 3:
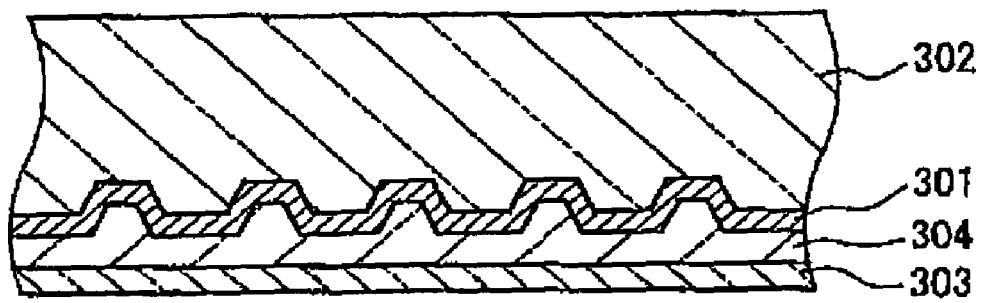
FIG. 3 is a cross-sectional view illustrating a thick-substrate transfer-type optical disk as an example of an optical disk produced by a conventional optical recording medium producing method.
Figure 4:
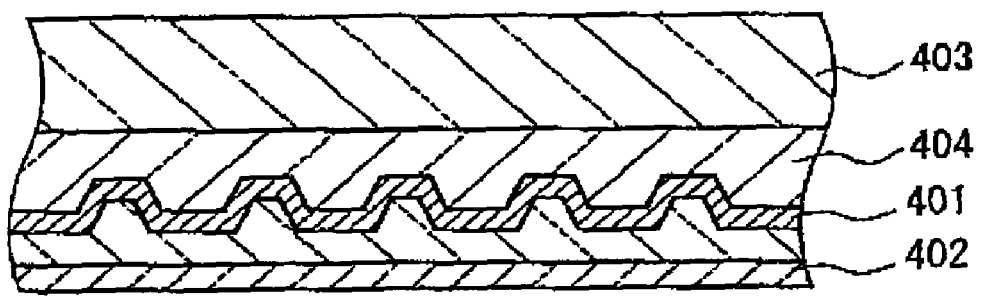
FIG. 4 is a cross-sectional view illustrating a thin-substrate transfer-type optical disk as an example of an optical disk produced by a conventional optical recording medium producing method.
Figure 5:
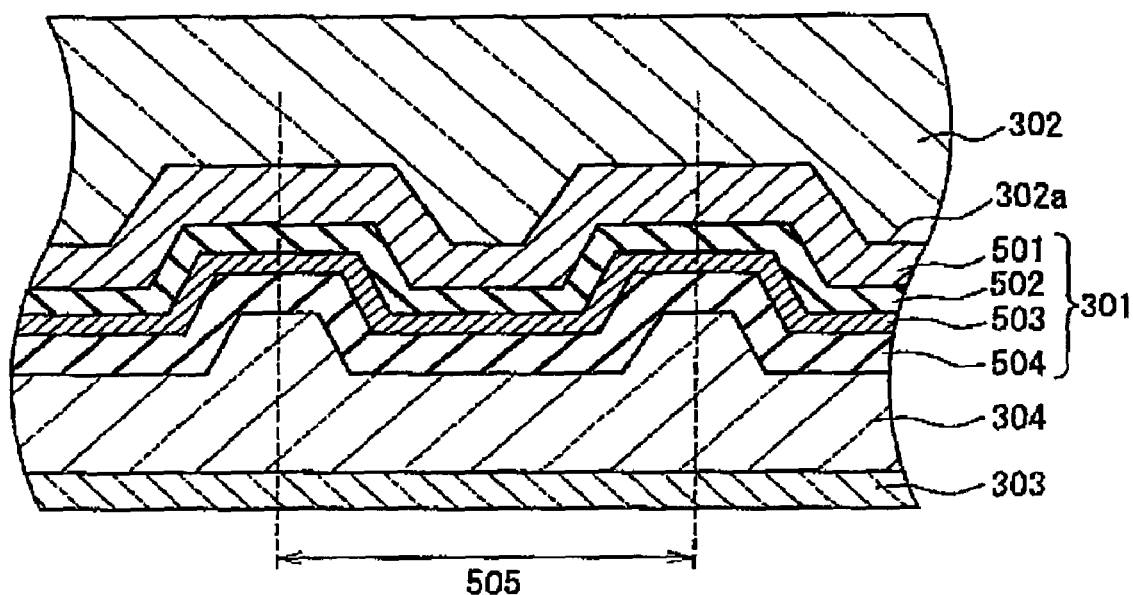
FIG. 5 is an enlarged cross-sectional view illustrating a thin film layer of a thick-substrate transfer-type optical disk as an example of an optical disk produced by a conventional optical recording medium producing method.
Figure 8A:
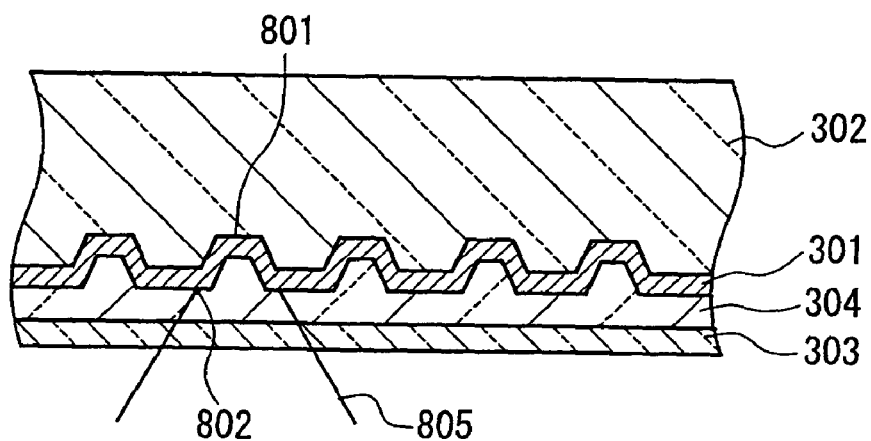
FIG. 8A is a cross-sectional view illustrating a state of reproduction of a thick-substrate transfer-type optical disk as an example of an optical disk produced by a conventional optical recording medium producing method.
Figure 8B:
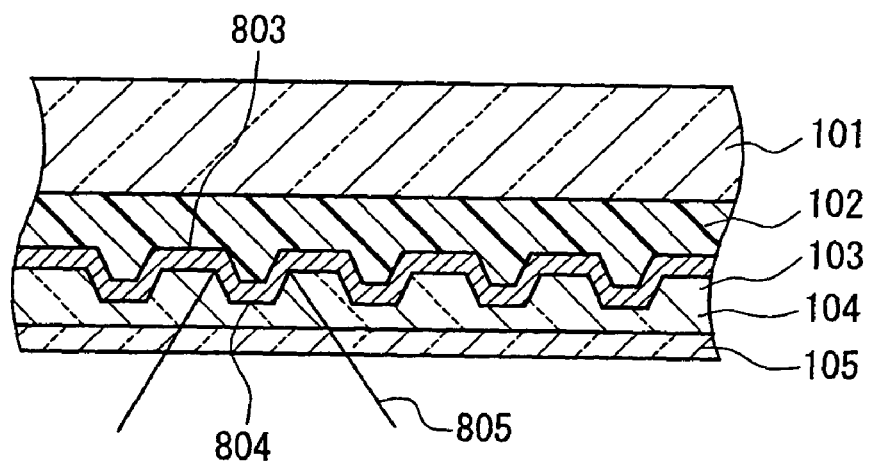
FIG. 8B is a cross-sectional view illustrating a state of reproduction of an optical disk produced by the optical recording medium producing method of the present invention.

FIGS. 8A and 8B illustrate states of reproduction of the conventional thick-substrate transfer-type optical disk shown in FIG. 3 and the optical disk according to the present embodiment shown in FIG. 1, respectively. FIG. 8A is a view illustrating a state in which the conventional thick-substrate transfer-type optical disk is subjected to a reproducing operation, while FIG. 8B is a view illustrating a state in which the optical disk according to the present embodiment is subjected to a reproducing operation. Here, a depth/height of recesses/projections forming recording tracks 801 on the first substrate 302 of the conventional optical disk shown in FIG. 8A was set to be 36 nm. Furthermore, in order that a depth/height of recesses/projections forming recording tracks 804 on the signal transfer layer 102 of the optical disk according to the present embodiment shown in FIG. 8B should be 36 nm, a depth/height of recesses/projections on the transfer stamper used for the transfer of recording tracks was set to be 40 nm.

Furthermore, to perform the measurement of the disks under the same conditions, the recording tracks 801 of the conventional thick-substrate transfer-type optical disk that are obtained by transfer from projections of the Ni stamper are compared regarding disk noise with the recording tracks 804 of the optical disk according to the present embodiment that are obtained by transfer from recesses of the resin-made transfer stamper. Besides, space tracks 802 of the conventional thick-substrate transfer-type optical disk that are obtained by transfer from recesses of the Ni stamper are compared regarding disk noise with space tracks 803 of the optical disk according to the present embodiment that are obtained by transfer from projections of the resin-made transfer stamper. As a result, the disk noise occurring when the recording tracks 801 of the conventional thick-substrate transfer-type optical disk were reproduced was −75.0 dBm at 12 MHz, while the disk noise occurring when the recording tracks 804 of the optical disk according to the present embodiment were reproduced was −78.2 dBm at 12 MHz. Thus, the optical disk according to the present embodiment exhibited an improved property regarding disk noise of recording tracks by 3.2 dB at 12 MHz.

Furthermore, the disk noise occurring when the space tracks 802 of the conventional thick-substrate transfer-type optical disk were reproduced was −74.0 dBm at 12 MHz, while the disk noise occurring when the space tracks 803 of the optical disk according to the present embodiment were reproduced was −76.0 dBm at 12 MHz. Thus, the optical disk according to the present embodiment exhibited an improved property regarding disk noise of space tracks by 2.0 dB at 12 MHz.

The reason why the improvement of the property regarding the disk noise occurring when the recording tracks 804 were reproduced was greater as compared with the improvement of the property regarding the disk noise occurring when the space tracks 803 were reproduced is considered to stem from the difficulty in transfer of the recording tracks of the transfer stamper to be transferred, which are the recesses of the transfer stamper. Namely, the transfer of the recording tracks that are recesses of the transfer stamper using a viscous ultraviolet-curable resin is difficult since the viscous ultraviolet-curable resin less smoothly enters the recesses. In contrast, in the transfer of projections of the transfer stamper corresponding to the space tracks 803 to the ultraviolet-curable resin, the projections of the transfer stamper are pressed against the ultraviolet-curable resin, where the pattern of the transfer stamper is transferred in more detail as compared with the case where the ultraviolet-curable resin enters the recesses of the transfer stamper. As a result, the recording tracks 804 have a surface roughness smaller than that of the space tracks 803 formed by transfer, and hence, reproduction disk noise of the former is smaller than that of the latter. Besides, the reason why disk noise occurring upon the reproduction of the space tracks 803 to which the pattern of the transfer stamper tends to be transferred in more detail is smaller than disk noise occurring upon the reproduction of the space tracks 802 of the thick-substrate transfer-type optical disk according to the prior art is that groove edges of the recording tracks 804 with an improved surface roughness condition also fall within the range of reproduction when the space tracks 803 are reproduced.

The foregoing description refers to an example in which a pattern of recesses/projections that provide information to be transferred, which is formed on the information surface of the transfer stamper 605, is transferred to the ultraviolet-curable resin 604 so that recesses/projections formed on the ultraviolet-curable resin 604 by transfer have a depth/height approximately 10% smaller than the depth/height of the recesses/projections on the information surface of the transfer stamper 605. However, an optical disk in which a transferred pattern has a depth/height of recesses/projections 5% to 30% smaller than the depth/height of recesses/projections of the original pattern achieves an identical effect. It should be noted that the foregoing description mentions an example in which the transfer of the pattern of the transfer stamper is carried out using the ultraviolet-curable resin 604 having a viscosity of 150 mPa·m, but it has been confirmed that using an ultraviolet-curable resin with a viscosity in a range of 30 mPa·s to 4000 mPa·s, a pattern of recesses of a transfer stamper was transferred to the ultraviolet-curable resin so that a transferred pattern had a height of projections 5% to 30% smaller than the depth of the recesses of the original pattern. Therefore, an ultraviolet-curable resin 604 with a viscosity in a range of 30 mPa·s to 4000 mPa·s is applicable. Furthermore, the foregoing description refers to a case where a 1.1 mm-thick disk made of polycarbonate having a weight per unit area of 0.15 g/cm² is used as the transfer stamper 605, but it has been confirmed that using a disk having a weight per unit area in a range of 0.03 g/cm² to 0.20 g/cm², a pattern of recesses in the transfer stamper was transferred to an ultraviolet-curable resin so that a transferred pattern had a depth/height 5% to 30% smaller than that of the original pattern. Therefore, a disk having a weight per unit area in a range of 0.03 g/cm² to 0.20 g/cm² is applicable as the transfer stamper 605.

Therefore, a 0.6 mm-thick disk made of a resin material and having a weight per unit area of 0.08 g/cm², for instance, which is used in DVDs and the like, is applicable as a transfer stamper. It should be noted that it is not preferable to use a disk that is made of a resin material and has a thickness of less than 0.3 mm, since the low rigidity of the substrate causes warpage, which causes the thickness of the ultraviolet-curable resin to be non-uniform inside the surface range, and makes it difficult to decrease a deviation between axes of the first substrate and the transfer stamper. Besides, it also should be noted that it is not desirable to use a disk that is made of a resin material and has a thickness of more than 1.1 mm for forming the transfer stamper, since the transfer stamper has an increased weight. The increased weight thereof makes it difficult to synchronously spin the first substrate and the transfer stamper that are laminated. Furthermore, such a thickness requires design change of an injection compression molder used in molding substrates for the conventional optical disks so as to change the substrate thickness set therein.

Furthermore, though the description of the present embodiment refers to as an example a case where, as shown in FIGS. 6C to 6E, the ultraviolet-curable resin 604 of one type is interposed between the first substrate 601 and the transfer stamper 605 so as to form the signal transfer layer 607, the ultraviolet-curable resin 604 may be composed of two or more layers. For instance, in the case where the ultraviolet-curable resin A for forming the signal transfer layer 102 is a resin having a greater adhesiveness to the transfer stamper 605 than an adhesiveness thereof to the first substrate 601, another ultraviolet-curable resin B may be provided between the first substrate 601 and the ultraviolet resin A so as to increase the adhesiveness therebetween. In this case, to ensure the detachment at an interface between the transfer stamper 605 and the ultraviolet-curable resin A, an ultraviolet-curable resin that has an adhesiveness to the ultraviolet-curable resin A greater than that between the ultraviolet-curable resin A and the transfer stamper 605 should be selected as the ultraviolet resin B. The signal transfer layer 607 is formed by providing the ultraviolet-curable resin A on the transfer stamper 605 beforehand, and applying the ultraviolet-curable resin B for increasing the adhesiveness to the first substrate 601 so as to cause the ultraviolet-curable resin A and the first substrate 601 to adhere to each other. In this method, upon the application of the ultraviolet-curable resin A over the transfer stamper 605, the signal transfer has to be carried out by utilizing the viscosity of the resin solely, without utilizing the weight of the transfer stamper 605. Therefore, an ultraviolet-curable resin having a low viscosity in a range of 30 mPa·s to 200 mPa·s desirably is used as the ultraviolet-curable resin A.

Sample disks were produced, each of which was obtained by transferring a pattern of recesses provided on the transfer stamper 605 as transfer-use recording tracks onto the ultraviolet-curable resin 604 so that a height of projections of the transferred pattern was 0% to 50% smaller than a depth of the recesses of the transfer stamper 605. Disk noises of the recording tracks were measured, and the measurement results are shown in Table 1. The sample disks were produced using the ultraviolet-curable resins 604 having viscosities ranging from 10 mPa·s to 5000 mPa·s. Here, the weight of the transfer stamper 605 was set to be of 0.15 g/cm². The measurement was performed in the following manner. The information surface was reproduced by using a recording/reproduction head with a laser wavelength of approximately 400 nm and a numerical aperture (NA) of an objective lens of approximately 0.85, and rotating an optical disk at a linear velocity of 4.5 m/s. Levels of disk noise at 12 MHz (reproduction frequency band of signals with a frequency of 0.375 μm) were measured with a spectrum analyzer. Table 1 shows how much disk noise performances were improved as compared with disk noise performances in the case of recording tracks of the conventional thick-substrate transfer-type optical disk. It should be noted that a rate by which the depth/height of the transferred pattern decreased is referred to as "Depth/Height Decrease" in Table 1.

TABLE 1

| Depth/Height Decrease (%) | 0 | 2.5 | 5 | 10 | 20 | 30 | 40 | 50 |
|---|---|---|---|---|---|---|---|---|
| Improvement of Noise Performance (dB) | 0 | 0.2 | 3 | 3.2 | 3.2 | 3.3 | — | — |

From the results shown in Table 1, it is seen that the disk noise performance was improved by setting the depth/height decrease to not less than 5%. In the case where the viscosity of the ultraviolet-curable resin 604 was set to be less than 30 mPa·s so that a depth/height of a transferred pattern was greater than that in the case where the depth/height decrease was 5% (in the case where the depth/height decrease was less than 5%), the surface roughness of the transfer stamper 605 was transferred in detail, thereby increasing the disk noise. In the case where a depth/height of a transferred pattern was smaller than that in the case where the depth/height decrease was 30% (in the case where the depth/height decrease exceeds 30%), it was difficult to perform uniform transfer within the disk, thereby causing transfer irregularities. These were confirmed. Furthermore, in the case of a disk obtained using the ultraviolet curable resin 604 with a viscosity of higher than 4000 mPa·s so as to achieve a depth/height decrease of not less than 40%, it was impossible to perform the measurement with respect to the disk due to transfer irregularities. Thus, it was confirmed that a noise amount was decreased as compared with the prior art by performing the transfer so that the depth/height of recesses/projections of the transferred pattern was 5% to 30% smaller, preferably 5% to 20% smaller, than the depth/height of recesses/projections of the transfer stamper. Furthermore, it was confirmed that to adjust the depth/height decrease in a range of 5% to 30%, the viscosity of the ultraviolet-curable resin may be set to be 30 mPa·s to 4000 mPa·s.

Sample disks were produced by using transfer stampers 605 with track pitches varying in a range of 0.2 μm to 1.0 μm, and disk noises of the recording tracks at a 12 MHz band were measured. Table 2 shows how much the disk noise performances with respect to recording tracks were improved as compared with the disk noise performance of the conventional thick-substrate transfer-type optical disk. It should be noted that the measurement was carried out in the same manner as that of the measurement shown in Table 1. Here, the sample disks were produced using the ultraviolet-curable resin 604 having a viscosity of 50 mPa·s, and the transfer stamper 605 having a weight of 0.15 g/cm².

TABLE 2

| Track Pitch (μm) | 0.2 | 0.25 | 0.3 | 0.4 | 0.5 | 0.6 | 0.7 | 0.8 | 0.9 | 1.0 |
|---|---|---|---|---|---|---|---|---|---|---|
| Improvement of Noise Performance (dB) | — | 3.0 | 3.2 | 3.4 | 3.4 | 3.3 | 3.0 | 3.1 | 0 | 0 |

According to the results shown in Table 2, the disk noise performance was improved in the case where the track pitch was not more than 0.80 μm. It was confirmed that in the case where the track pitch exceeded 0.8 μm, the disk noise increased (the improvement of the noise performance was decreased) since the surface roughness of the transfer stamper 605 was transferred in detail. Besides, it was confirmed also that in the case where the track pitch was decreased to less than 0.25 μm, it was impossible to perform uniform transfer within the disk, thereby causing transfer irregularities. Thus, it was impossible to perform the measurement in the case where the track pitch was 0.2 μm or less. From the foregoing results, it was confirmed that the noise amount was decreased as compared with the prior art by setting the track pitch in a range of 0.25 μm to 0.8 μm.

The foregoing description refers to an example in which a phase-change recording film is used as the thin film layer 103, but identical results were obtained also in the case where a reflection film made of Al, Ag, or an alloy of AgPdCu was formed and disk noise was measured. Furthermore, the foregoing describes the disk noises from grooves such as recording tracks or space tracks, but the same results were obtained in the case of disk noise from signal pits.

According to the present embodiment, an optical disk that exhibits excellent disk noise characteristics even in the case where a recording/reproduction head having an improved focusing performance with a reproduction wavelength of approximately 400 nm and an NA of an objective lens of 0.85 is used as a reproducing means was obtained by setting the pattern on the information surface of the transfer stamper so that the depth/height of recesses/projections of the pattern is greater than the desired depth of recesses of the signal transfer layer, and by appropriately setting the viscosity of the ultraviolet-curable resin and the weight of the stamper in the formation and transfer of the signal transfer layer by spinning.

EMBODIMENT 2

Figure 9:
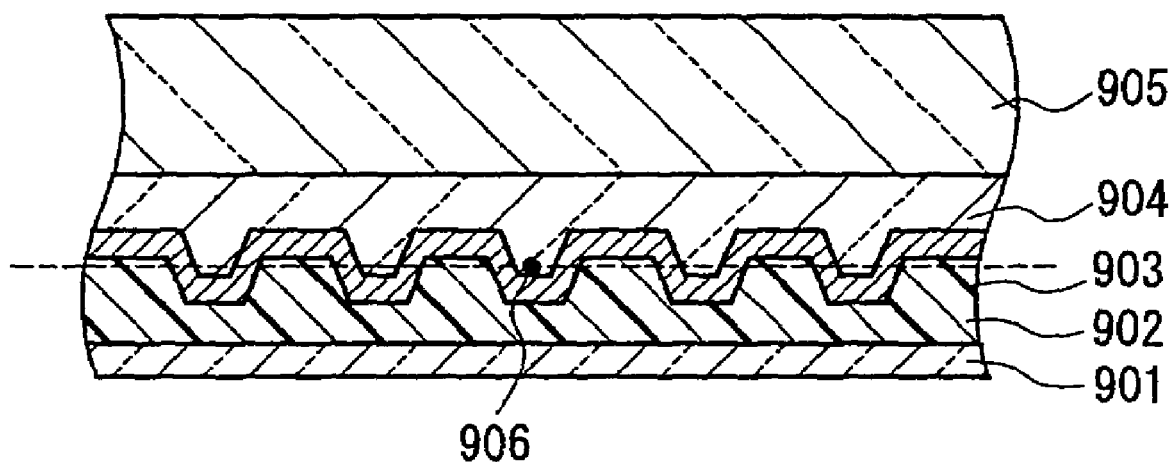
FIG. 9 is a cross-sectional view of an optical disk according to Embodiment 2 produced by an optical recording medium producing method of the present invention.

FIG. 9 is a cross-sectional view illustrating an optical disk according to an embodiment of an optical recording medium of the present invention. A 0.1 mm-thick disk made of polycarbonate is used for forming a first substrate 901. A signal transfer layer 902 is made of an ultraviolet-curable resin, on one of whose surfaces signal pits or recording tracks are formed as projections, which are formed by transferring a pattern on a transfer stamper. The transfer stamper is formed in the same manner as that in Embodiment 1, and a 1.1 mm-thick disk made of a resin is used for forming the transfer stamper to prevent warpage and improve rigidity of the transfer stamper, so as to allow for a plurality of transfer operations.

FIGS. 10A to 10E illustrate a process for forming the signal transfer layer 902 on the first substrate 901 as a base. First of all, a first substrate 1001 as a base is fixed on a turntable 1002 by a disk centering jig 1003 provided substantially at the center of the turntable 1002 as well as by suction of a plurality of small vacuum holes (not shown) provided on an upper surface of the turntable 1002, so as to reduce the eccentricity of the first substrate 1001 from a rotational axis of the turntable 1002 (see FIG. 10A). An ultraviolet-curable resin 1004 is applied with a dispenser on the first substrate 1001 fixed on the turntable 1002 so that the ultraviolet-curable resin 1004 is spread over a range of a predetermined radius substantially in a concentric form (see FIG. 10B). Furthermore, a transfer stamper 1005 is laminated on the first substrate 1001 on which the ultraviolet-curable resin 1004 is applied so that an information surface of the transfer stamper 1005 faces the first substrate 1001.

Figure 10A:
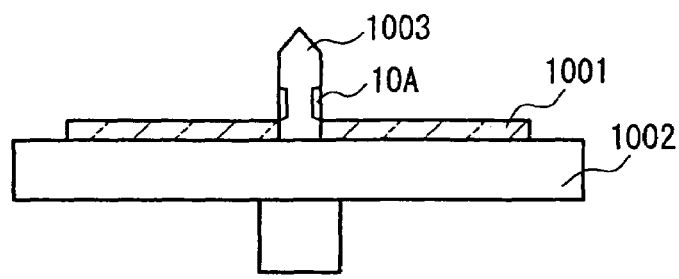
FIGS. 10A to 10E are cross-sectional views illustrating another example of a production process of an optical recording medium producing method of the present invention.
Figure 10B:
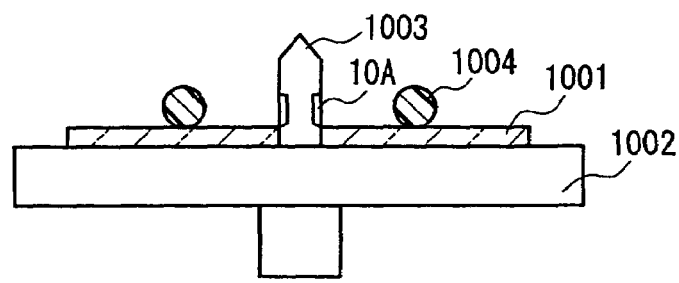
Figure 10C:
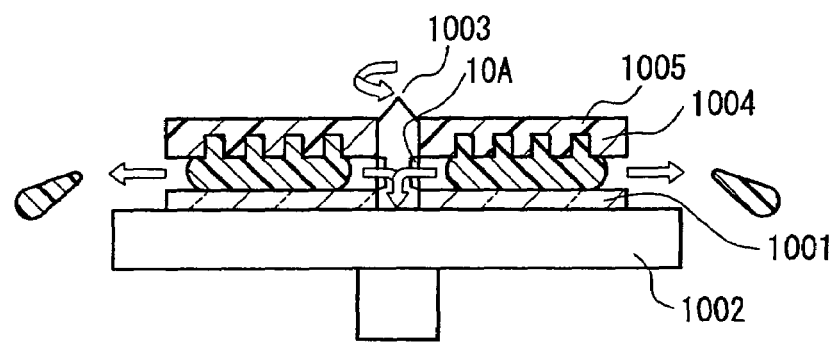
Figure 10D:
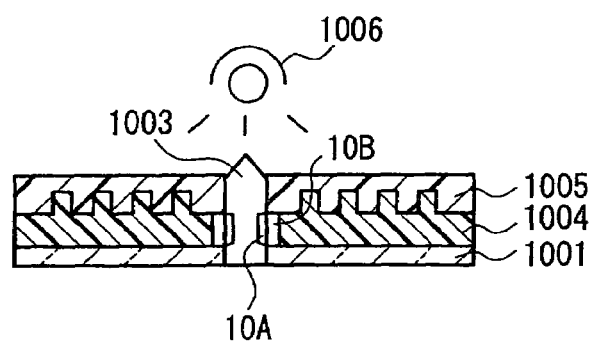
Figure 10E:
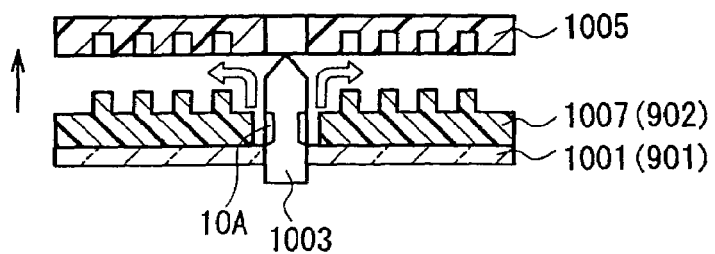

The ultraviolet-curable resin 1004 is spread by spinning the turntable 1002 in a state in which the first substrate 1001 and the transfer stamper 1005 are laminated, while simultaneously a pattern of recesses/projections forming the recording tracks or signal pits on the information surface of the transfer stamper 1005 are transferred onto a surface of the ultraviolet-curable resin 1004 (see FIG. 10C). Here, the ultraviolet-curable resin 1004 flows toward a periphery due to a centrifugal force generated by the spinning, which tends to make it difficult to fill the ultraviolet-curable resin 1004 in a central portion inside the range of the predetermined radius to which the ultraviolet-curable resin 1004 is dripped. To compensate this, the ultraviolet-curable resin 1004 between the first substrate 1001 and the transfer stamper 1005 may be sucked toward the central portion by a vacuum drawing mechanism 10A provided at the centering jig 1003. Furthermore, in order to transfer the pattern formed on the information surface of the transfer stamper 1005 to the ultraviolet-curable resin 1004 with an approximately 90% of a depth/height the recesses/projections, a resin containing, for instance, an acrylic resin as a principal component, having a viscosity of approximately 150 mPa·s, is used as the ultraviolet-curable resin 1004, while a disk made of polycarbonate that is 120 mm in diameter and 1.1 mm in thickness, has a center hole at center with a diameter of 30 mm, and is approximately 16 g in weight (weight per unit area: 0.15 g/cm$^2$) is used as the transfer stamper 1005. It should be noted that, other than polycarbonate, a polyolefin-based resin or an acryl-based resin may be used for forming the transfer stamper 1005.

The ultraviolet-curable resin 1004 formed between the first substrate 1001 and the transfer stamper 1005 is cured when ultraviolet light is applied thereto by an ultraviolet projector 1006 (see FIG. 10D), and thereafter, the transfer stamper 1005 is detached from the ultraviolet-curable resin 1004 at an interface therebetween. Thus, on the first substrate 1001 (corresponding to the first substrate 901 in FIG. 9), an ultraviolet-curable resin layer is formed on which the pattern of recesses/projections of the transfer stamper 1005 is transferred with a depth/height of approximately 90% of the depth/height of the recesses/projections on the transfer stamper 1005: namely, a signal transfer layer 1007 (corresponding to the signal transfer layer 902 in FIG. 9) is formed (see FIG. 10E).

As a means for detachment, for instance, a region 10B in which the ultraviolet-curable resin is not filled may be secured in the central portion in a disk obtained by combining the first substrate 1001 and the transfer stamper 1005 with each other, and a mechanical detaching jig may be inserted or compressed air may be injected between the first substrate 1001 and the transfer stamper 1005. By so doing, they are detached uniformly in a radial direction of the disk. A polyolefin-based resin may be used as the material of the transfer stamper 1005 with the detachability thereof taken into consideration, so as to ensure the detachment at an interface between the ultraviolet-curable resin 1004 and the transfer stamper 1005. Here, a surface roughness of space tracks on the transfer stamper 1005 was determined to be 3 nm according to the measurement by an atomic force microscope, whereas a surface roughness of space tracks formed on the signal transfer layer 1007 corresponding to the foregoing transfer stamper 1005 was determined to be 1 nm. After the signal transfer layer 1007 is formed, a phase-change recording film of the same type as that in Embodiment 1 is formed on the signal transfer layer 1007. It should be noted that in Embodiment 1, a reflection film, a dielectric film, a recording film, and a dielectric film are laminated in the stated order, while in the present embodiment they are laminated on the signal transfer layer 1007 in an inversed order.

An adhesion layer 904 provided for adhering a thin film layer 903 and a second substrate 905 as a thick substrate is formed by, for example, applying an ultraviolet-curable resin over at least one of the thin film layer 903 and the second substrate 905, and subjecting the same to spinning so that air bubbles contained in the ultraviolet-curable resin are removed and the thickness thereof is controlled. The second substrate 905 is composed of an approximately 1.1 mm-thick disk made of a resin such as polycarbonate. The thickness of the signal transfer layer 902 is controlled so that a focus position 906 where a laser light emitted from the recording/reproduction head is focused falls on a position determined according to a sum of the thicknesses of the first substrate 901 as the thin substrate and the signal transfer layer 902. Thus, with the transparent layer 904 (by curing the ultraviolet-curable resin), the first substrate 901 with the signal transfer layer 902 and the thin film layer 903 provided thereon and the second substrate 905 are caused to adhere to each other.

With the present invention, it is possible to form an information surface having inverted recesses/projections as compared with those according to Embodiment 1 on the first substrate on the reproduction beam incident side, and to provide a disk with excellent disk noise performance as in Embodiment 1 by appropriately setting the viscosity of the ultraviolet-curable resin and the weight of the transfer stamper in the formation and transfer of the signal transfer layer by spinning. Furthermore, as to optical disks according to Embodiment 2, the improvement of noise performances as compared with the conventional optical disk was obtained as a result, as is the case with the optical disk of Embodiment 1.

The invention claimed is:

1. A method for producing an optical recording medium, comprising:
    a first step of laminating a substrate and a transfer stamper with a not cured ultraviolet-curable resin interposed therebetween, the transfer stamper having, on at least one of surfaces thereof, recesses/projections that provide information to be transferred;
    a second step of transferring the information to be transferred of the transfer stamper onto a surface of the ultraviolet-curable resin;
    a third step of detaching the transfer stamper from the ultraviolet-curable resin at an interface therebetween after the ultraviolet-curable resin is cured; and
    a fourth step of forming a thin film layer on the information-transferred surface of the ultraviolet-curable resin, the thin film layer including at least one of a recording film and a reflection film,
    wherein at least one of a weight of the transfer stamper and a viscosity of the ultraviolet-curable resin is set so that a surface roughness of the information-transferred surface of the ultraviolet-curable resin is smaller than a surface roughness of the surface of the transfer stamper on which the information to be transferred is provided.

2. The method for producing an optical recording medium according to claim 1, wherein in the second step, spinning is carried out in a state in which the substrate and the transfer stamper are laminated, so that the ultraviolet-curable resin is spread and the information to be transferred of the transfer stamper is transferred to the ultraviolet-curable resin.

3. The method for producing an optical recording medium according to claim 1, wherein the ultraviolet-curable resin has a viscosity of not less than 30 mPa·s and not more than 4000 mPa·s.

4. The method for producing an optical recording medium according to claim 3, wherein the ultraviolet-curable resin has a viscosity of not less than 30 mPa·s and not more than 500 mPa·s.

5. The method for producing an optical recording medium according to claim 1, wherein a depth/height of recesses/projections formed on the ultraviolet-curable resin as a result of the transfer is 5% to 30% smaller than a depth/height of the recesses/projections of the transfer stamper that provide information to be transferred.

6. The method for producing an optical recording medium according to claim 5, wherein the depth/height of the recesses/projections formed on the ultraviolet-curable resin as a result of the transfer is 5% to 20% smaller than the depth/height of the recesses/projections of the transfer stamper that provide information to be transferred.

7. The method for producing an optical recording medium according to claim 1, wherein a track pitch of recording tracks or signal pits to be transferred that are included in the information to be transferred of the transfer stamper is 0.25 µm to 0.8 µm.

8. The method for producing an optical recording medium according to claim 7, wherein a width of the recording tracks to be transferred or a width of the signal pits is 30% to 70% of the track pitch.

9. The method for producing an optical recording medium according to claim 1, wherein a depth of recording tracks or signal pits to be transferred that are included in the information to be transferred of the transfer stamper is 10 nm to 100 nm.

10. The method for producing an optical recording medium according to claim 1, wherein the transfer stamper has a weight per unit area of 0.03 g/cm$^2$ to 0.20 g/cm$^2$.

11. The method for producing an optical recording medium according to claim 1, wherein the transfer stamper is made of a resin material.

12. The method for producing an optical recording medium according to claim 1, wherein the recording film is made of a phase-change recording film material.

13. The method for producing an optical recording medium according to claim 1, wherein the thin film layer comprises a reflection film.

14. The method for producing an optical recording medium according to claim 1, wherein the stamper is positioned on an upper side with respect to the substrate.

15. The method for producing an optical recording medium according to claim 1, wherein the transfer stamper has a thickness of 0.3 mm to 1.1 mm.

16. An optical recording medium produced by the method for producing an optical recording medium according to claim 1.

* * * * *

UNITED STATES PATENT AND TRADEMARK OFFICE
CERTIFICATE OF CORRECTION

PATENT NO. : 7,051,347 B2  
APPLICATION NO. : 10/381152  
DATED : May 23, 2006  
INVENTOR(S) : Tomiyama et al.

Page 1 of 1

It is certified that error appears in the above-identified patent and that said Letters Patent is hereby corrected as shown below:

Title page, item (*), the phrase "This patent is subject to a terminal disclaimer" should be omitted from the face of the patent.

Signed and Sealed this

Sixteenth Day of October, 2007

JON W. DUDAS  
*Director of the United States Patent and Trademark Office*